United States Patent
Hottgenroth

(10) Patent No.: US 11,870,771 B2
(45) Date of Patent: Jan. 9, 2024

(54) METHOD FOR SECURE COMMUNICATION BETWEEN A FIELD DEVICE OF AUTOMATION TECHNOLOGY AND AN END DEVICE AS WELL AS A SYSTEM FOR SECURE COMMUNICATION BETWEEN A FIELD DEVICE AND AN END DEVICE

(71) Applicant: KROHNE Messtechnik GmbH, Duisburg (DE)

(72) Inventor: Wolfgang Hottgenroth, Essen (DE)

( * ) Notice: Subject to any disclaimer, the term of this patent is extended or adjusted under 35 U.S.C. 154(b) by 90 days.

(21) Appl. No.: 16/813,195

(22) Filed: Mar. 9, 2020

(65) Prior Publication Data

US 2020/0287895 A1    Sep. 10, 2020

(30) Foreign Application Priority Data

Mar. 8, 2019   (DE) .......................... 102019106049.4

(51) Int. Cl.
*H04L 29/06*    (2006.01)
*H04L 9/40*    (2022.01)

(52) U.S. Cl.
CPC ...... *H04L 63/0853* (2013.01); *H04L 63/0428* (2013.01); *H04L 63/083* (2013.01); *H04L 63/105* (2013.01)

(58) Field of Classification Search
CPC ............ H04L 63/0853; H04L 63/0428; H04L 63/083; H04L 63/105; G05B 2219/25428; G05B 2219/31131; Y02P 90/02

(Continued)

(56) References Cited

U.S. PATENT DOCUMENTS 7,277,726 B2 * 10/2007 Ahya .................... H04W 24/00
                                                                       455/418
9,197,635 B2 * 11/2015 Rodriguez ............ H04L 63/067

(Continued)

FOREIGN PATENT DOCUMENTS

DE    102005063085 A1    7/2007
DE    102012109348    *   4/2014

(Continued)

OTHER PUBLICATIONS

Authentication and authorization mechanisms for substation automation in smart grid network, Vaidya et al., Jan. 2013 (Year: 2013).*

*Primary Examiner* — Jahangir Kabir
(74) *Attorney, Agent, or Firm* — Patrick D. Duplessis

(57) ABSTRACT

A method for secure communication between a field device and an end device is disclosed. The method includes: storing an individual access code in the end device, transmitting an access code of the end device to the field device, connecting the field device to an authentication server via a server communication link, using the field device to transmit the access code or an access code derived from the access code to the authentication server, storing authentication data on the authentication server, checking the authenticity of the access code on the authentication server using the authentication data, transmitting the resulting authentication result from the authentication server via the server communication link to the field device, and, depending on the authentication result transmitted to the field device, making resources of the field device available to the end device.

14 Claims, 3 Drawing Sheets

(58) Field of Classification Search
USPC .............................................................. 726/4
See application file for complete search history.

(56) References Cited

U.S. PATENT DOCUMENTS

| 9,504,075 | B2* | 11/2016 | Isenmann | .............. | H04W 76/14 |
| 2015/0156805 | A1* | 6/2015 | Isenmann | .............. | G08C 17/02 |
| | | | | | 455/426.1 |

FOREIGN PATENT DOCUMENTS

| DE | 102012109348 A1 | 4/2014 |
| DE | 102014105076 A1 | 10/2015 |
| EP | 3312692 A1 | 4/2018 |

* cited by examiner

METHOD FOR SECURE COMMUNICATION BETWEEN A FIELD DEVICE OF AUTOMATION TECHNOLOGY AND AN END DEVICE AS WELL AS A SYSTEM FOR SECURE COMMUNICATION BETWEEN A FIELD DEVICE AND AN END DEVICE

TECHNICAL FIELD

The invention relates to a method for secure communication between a field device of automation technology and an end device connected to the field device via an end device communication link, wherein the field device has a cause-effect relationship with a physical process and the field device can be connected via a field bus interface to other field devices and/or a process control system for the exchange of process information. Furthermore, the invention also relates to a system for secure communication between a field device of automation technology and an end device.

BACKGROUND

Field devices in automation technology have been used for many decades for recording measured values (sensor technology) and for controlling final control elements (actuators) in physical-technical processes; this is what is meant when it is said that the field devices have a cause-effect relationship with a physical process. In the case of sensor-based field devices, they record process variables via their sensors, process the raw measurement data with the help of data processing electronics into a measured variable to be transmitted and usually transmit this measured variable to a higher-level process control system. The field devices work "in the field", they are usually very robust and designed to withstand interference, since they are exposed to the adversities of industrial processes, some of them are used outdoors. Thus, they do not function under "laboratory conditions".

In order to transmit measured data or actuating variables, the field device uses the fieldbus interface mentioned above, which implements an established protocol. The analog 4-20 mA interface, which has been used for decades, or the digital HART (Highway Addressable Remote Transducer) interface are, for example, among established fieldbus interfaces. In this case, a 2-wire arrangement often serves as the physical transmission medium, wherein the digital signal of the HART protocol can be modulated onto the analog current signal of the current interface. Fieldbus interfaces of this type only achieve comparatively low transmission rates, but they have an extraordinarily high continued existence in the process industry, as their reliability has been proven and they are considered to be influence-proof. It is often only possible to influence the field measuring device to a very limited extent via fieldbus interfaces, since access to field device functions that lie outside the actual transmission of measurement results or the reception of actuating variables via the fieldbus interface is not intended at all—intentionally, to ensure operational safety.

Sensitive functions, thus requiring security, of field devices which lie outside the field of measurement data or control signal transmission are, for example, parameterization, setting of operating modes, calibration parameters of the field device and diagnostics.

Efforts are being made to equip the field devices described above with an—additional—communication interface, namely the end device communication interface mentioned in the introduction, which is usually used to implement modern communication technologies so that higher transmission rates and modern operating interfaces can be implemented. This end device communication interface is mainly used to exchange non-process-relevant data.

The subject-matter of the present consideration is field devices that are equipped with an end device communication interface that enables an external end device to access information technology contents of the field device, whereby this information technology content is not primarily the actual measurement data. It is therefore not a process interface via which the field device outputs measurement data and receives actuating variables.

The end device can be a special operating device for the respective field devices, but it can also be a standard computer, a mobile phone or a tablet computer. End devices do not have to have their own operating unit (keyboard, mouse, touch screen) or display; they can also just be a memory unit with a corresponding hardware interface (e.g. USB stick, dongle).

SUMMARY

The object of the present invention is to provide a method for secure communication between the field device and the end device connected to the field device via the end device communication interface as well as a corresponding system comprising a field device and other components, in which illicit access to the field device by means of an end device communication interface is prevented with a high degree of certainty.

In the method described in the introduction, the object is achieved in that an individual access code is stored in the end device and the end device transmits its access code to the field device. The transmission of the access code can take place automatically when contacting the field device or only after request by the field device, which is not important here.

Furthermore, it is provided that the field device is connected to an authentication server via a server communication link and the field device transmits the access code or an access code derived from the access code to the authentication server. The access code can therefore be transmitted to the authentication server in plain text or also in a modified, for example encrypted form.

Thus, it is provided that authentication data is stored on the authentication server, which is used to check the authenticity of the access code—or the derived access code—and thus the authenticity of the end device on the authentication server. Accordingly, authorization of the end device is checked on the authentication server that is different from the field device. This ensures that an end device with an unknown access code is recognized as an unauthorized communication participant. The check on the authentication server can therefore show that an end device with the corresponding access ID is unknown—and therefore unauthorized—or is known and therefore has a certain communication authorization.

The resulting authentication result determined on the authentication server is then transmitted to the field device via the server communication link. The field device thus has the information whether the end device connected to it is known or unknown and therefore has a communication authorization or not. Depending on the authentication result transmitted to the field device, resources of the field device are then made available to the end device. If the check shows that the end device is unknown, no field device resources are made available to the end device. This result can be communicated to the end device, and the field device is not able to react to the unknown end device by any means.

The advantage of using an authentication server is that corresponding authentication data does not have to be stored in the field device itself. This is particularly useful for large automated technical systems in which a large number of field devices are used, for example one or several hundreds of field devices. In such systems, the number of end devices or users of end devices that should be able to access the field devices used for various reasons is naturally also increasing.

The individual access code should uniquely identify the end device connected to the field device or the user of the end device connected to the field device. In a preferred design it is therefore provided that the individual access code has an individual end device name and an individual end device password and/or that the individual access code has an individual username and an individual user password. This makes it possible, for example, that a specific end device—for example a laptop—used by several users to have a code that is independent of the end and yet uniquely identifies the corresponding user. If different users of one and the same mobile device have different usernames and user passwords, the different users of the one mobile device can be distinguished from each other.

In a preferred implementation of the method, it is provided that the address of the authentication server is stored in the field device and the server communication connection is established using the address of the authentication server. In this manner, it is possible, for example, for the authentication server and the field device to be connected via an information technology network to which a large number of participants are connected who can contact each other if they know the corresponding participant addresses. It is thus possible to use, for example, a communication link based on the Internet protocol (TCP/IP).

In a preferred implementation of the method, it is provided that cryptographic means are stored in the field device and in the authentication server which allow the field device and the authentication server to exchange encrypted data with each other. This cryptographic means can, for example, be a so-called "shared secret", i.e. a key that both communication partners have knowledge of. The field device then uses its cryptographic means to derive an encrypted, derived access code from the access code and transmits it to the authentication server. The authentication server can then use its corresponding cryptographic means to decrypt the encrypted, derived access code to the access code in plain text. It is immediately obvious that this creates a higher degree of security, since it is much more difficult to influence the transmission of the access code.

A further development of the method is characterized in that the authentication data of the authentication server also include scopes of rights that are linked to an access code and that the authentication result transmitted from the authentication server to the field device also includes the scopes of rights assigned to an access code. On the field device, the information about the scope of rights is then used to make resources of the field device available to the end device only according to the linked scope of rights. Scope of rights can be, for example, "read access only", "limited read access", "write access", "limited write access", "function request" or even just the "limited function request". The scope of rights can then also be provided with a parameter list and/or a function list. The parameter list can then contain, for example, the parameters that can be read by the end device or the parameters that can also be changed by the end device in writing. Accordingly, a function list can list the functions that can be activated by the end device on the field device.

In a further development of the method it is provided that the scope of rights designates groups of sub-rights, whereby the definitions of the groups of sub-rights are either stored on the field device or are stored on the authentication server and in the latter case are transmitted to the field device upon request. This facilitates the administration of user groups and their authorizations. Possible groups of sub-rights can be, for example, user, operator, expert, service, factory. A pure user of the field device can then, for example, have read-only access to a few parameters of the field device. Important system parameters, such as calibration data, can then be accessed either read-only or not at all. An end device that is connected to the field device during the manufacturing process (factory) can accordingly have write access to all parameters of the field device.

A preferred implementation of the method is characterized in that the authentication data of the authentication server also includes session attributes associated with an access code, wherein the authentication result transmitted from the authentication server to the field device also includes the session attributes associated with an access code. Such a session attribute can be, for example, the session language, the session duration, the absolute session time, the number of session accesses, or the session interface. The session duration is then the time after which the field device automatically interrupts the end device communication connection. The absolute session time is a time window in the course of the day during which an end device communication link can only be established; an end device communication link cannot be established outside the absolute time window. The session interface is the technical interface via which the end device communication link is established. For example, it can be the specification of an interface in the following technologies: Bluetooth, wireless local network (WLAN, Wi-Fi), infrared (IR), Ethernet.

The introduction of scopes of rights and also session attributes enables the field device to provide the end device with an individualized user interface and the user interface to be customized based on the scopes of rights and/or session attributes. The individualized user interface can be made available to the end device by the field device, for example, by an individualized Web server. If the end device itself does not have a display, it can also be useful for the field device to provide the individualized user interface on a physical display of the field device itself. For example, a menu structure can then be displayed in a certain language and only those parameters and/or functions can be displayed that correspond to the respective scope of rights.

In a particularly preferred implementation of the method, it is provided that the field device logs the communication with the end device at least partially in a transcript and transmits the transcript to the authentication server at the end of the communication, i.e. the corresponding session, whereby the transcript is stored on the authentication server. Alternatively, the transcript is continuously transmitted to the authentication server during communication and the transcript is continuously stored on the authentication server. This ensures that any influence on the field device can be traced. By evaluating such transcripts, it is also possible to determine which measures have been taken over the end device communication link, which allows conclusions to be drawn regarding, for example, operation, operability, maintenance intensity and possible sources of error.

In connection with the end device communication link, it has already been explained that it can be implemented in various technologies. The same applies to the server communication link, which can also be designed according to different technologies (e.g. Bluetooth, wireless local network, infrared, Ethernet), wherein different technologies can be implemented simultaneously.

The object derived above is also achieved by a system for secure communication between a field device of automation technology and an end device. The system comprises the field device and an authentication server, whereby the field device has a cause-effect relationship with a physical process and the field device can be connected to other field devices and/or a process control system via a fieldbus interface. The field device has data processing electronics that can be designed with varying degrees of complexity. Today's field devices use digital signal processors, microcontrollers, analog/digital converters, digital/analog converters, corresponding interface electronics and also components for analog signal processing. The field device has an end device communication interface different from the fieldbus interface and can be connected to the end device with this end device communication interface. Furthermore, the field device is connected to the authentication server via a server communication interface.

What has been said before about the corresponding terms with regard to the method described in detail applies analogously to the system of field device and authentication server described here. The data processing electronics are designed in such a way that they can receive an individual access code of the connected end device via the end device communication interface. If we are talking about data processing electronics being designed in such a manner that various processes can be carried out with them, then this means that the data processing electronics are specially designed so that they can easily perform the described function. This does not refer to data processing electronics which must first be prepared for this purpose—for example by appropriate programming which is still to be carried out—or which could theoretically be processed in such a way that it could then also theoretically execute the described functionality.

The authentication server is specifically designed in such a manner that authentication data is stored on it, on the basis of which the authenticity of the access code can be and is checked on the authentication server, wherein the resulting authentication result is transmitted from the authentication server to the field device. Accordingly, the data processing electronics of the field device are designed to receive the authentication result determined by the authentication server via the server communication interface.

Finally, the data processing electronics are also specifically designed to make resources of the field device available to the end device depending on the received authentication result.

All in all, the field device and the authentication server are designed such that they can carry out the previously described method for secure communication between the field device and the end device.

In case of a particularly preferred design of the field device, it is provided that the server communication interface, the end device communication interface and any software services related to these communication interfaces are implemented on the field device isolated from the fieldbus interface and from software services related to the fieldbus interface. This ensures that it is not possible to influence the fieldbus interface and software services related to the fieldbus interface via the server communication interface, via the end device communication interface and via any software services related to these communication interfaces.

BRIEF DESCRIPTION OF THE DRAWINGS

In detail, there is now a plurality of possibilities for designing and further developing the method according to the invention for secure communication between a field device of automation technology and an end device connected to the field device via an end device communication interface and the corresponding system consisting of a field device and an authentication server. For this purpose, reference is made on the one hand to the patent claims subordinate to the independent patent claims and on the other hand to the following description of embodiments in conjunction with the drawings.

DETAILED DESCRIPTION

Figure 1:
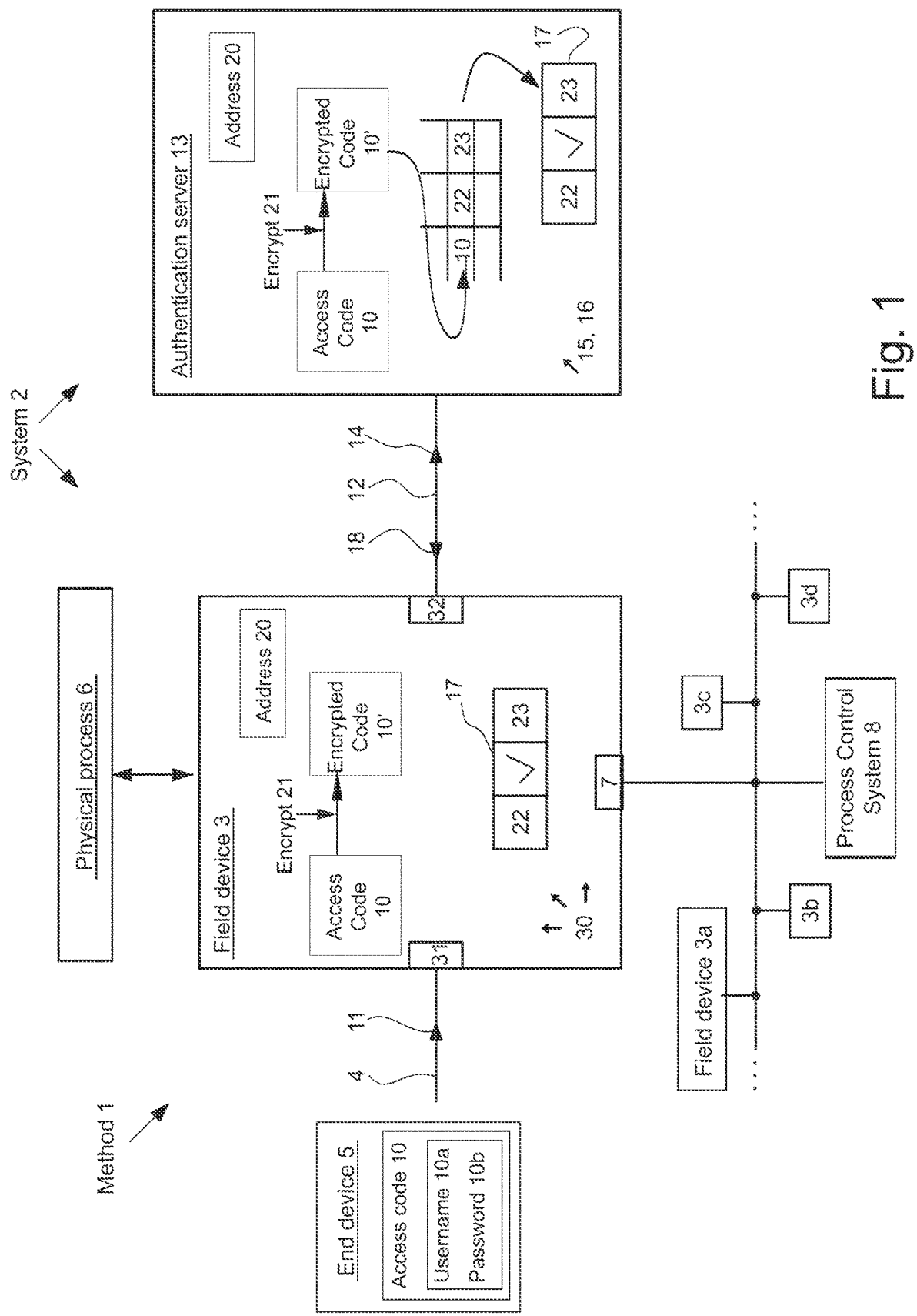
FIG. 1 schematically illustrates the method according to the invention for secure communication between a field device of automation technology and a connected end device as well as a system according to the invention consisting of field device and authentication server.

FIGS. 1 to 4 each illustrate a method 1 for secure communication between a field device 3 in automation technology and an end device 5 connected to the field device 3 via an end device communication link 4. FIG. 1 also illustrates the device-related structure for carrying out the method 1, in particular FIG. 1 serves to illustrate a system 2 for secure communication between a field device 3 and an end device 5.

As already described in the introduction, the field device 3 has a cause-effect relationship with a physical process 6, either the field device 3 records measurement data from the physical process 6 or actively influences the physical process 6 by, for example, changing valve positions, motor speeds, etc., i.e. in general actuating variables of connected actuators. The physical process 6 is often an automation system in an industrial application.

The field device 3 is connected to other field devices 3a, 3b, 3c, 3d via a fieldbus interface 7 and to a process control system 8, namely via a fieldbus 9. Process information is therefore exchanged via the fieldbus 9. In this case, the fieldbus 9 is implemented according to the HART standard.

In order to understand the advantages of the method 1 and the system 2 described below, it is necessary to realize that in real automation applications, a large number of field devices 3 have a cause-effect relationship with the physical process 6. In extensive applications, several hundred field devices 3 can be used which, if required, can be connected to one or more end devices 5, for example to check functioning (maintenance), to read diagnostic information or to re-parameterize the device. Contact to the respective field device 3 can thus be established by a large number of end devices 5. Initially it makes sense to store information in each field device 3 as to which end device 5 is known at all and therefore possibly has authorization to access the field device 3. If end devices 5 are no longer used or new end devices 5 are added, practically all affected field devices 3 must be informed about the new situation and corresponding information must be stored in them. This is where the method 1 and the system 2 come into play.

First, it is provided that an individual access code 10 is stored in the end device 5 and that—if there is contact between the end device 5 and the field device 3 via the end device communication link 4—the end device 5 transmits its access code 10 to the field device 3 11. In addition, the field device 3 is connected to an authentication server 13 via a server communication link 12. The field device 3 transmits 14 the access code 10 or an access code 10' derived from the access code 10 to the authentication server 13.

Authentication data 15 are stored on the authentication server 13, which are used to check 16 the authenticity of the access code 10 on the authentication server 13. In FIG. 1, the schematic representation of the authentication server 13 shows that authentication data 15 is stored in a table. In the present case, the access code 10 is listed in the table so that the authenticity of the access code 10 can be confirmed, i.e. the resulting authentication result 17 is positive. The resulting authentication result 17 is then transmitted 18 from the authentication server 13 via the server communication link 12 to the field device 3. The field device now—for the first time—has knowledge of the authentication result 17.

Depending on the authentication result 17 transmitted to the field device 3, the field device 3 now makes resources of the field device 3 available to the end device 5. Resources of the field device 3 can be data but also functions.

Figure 2:
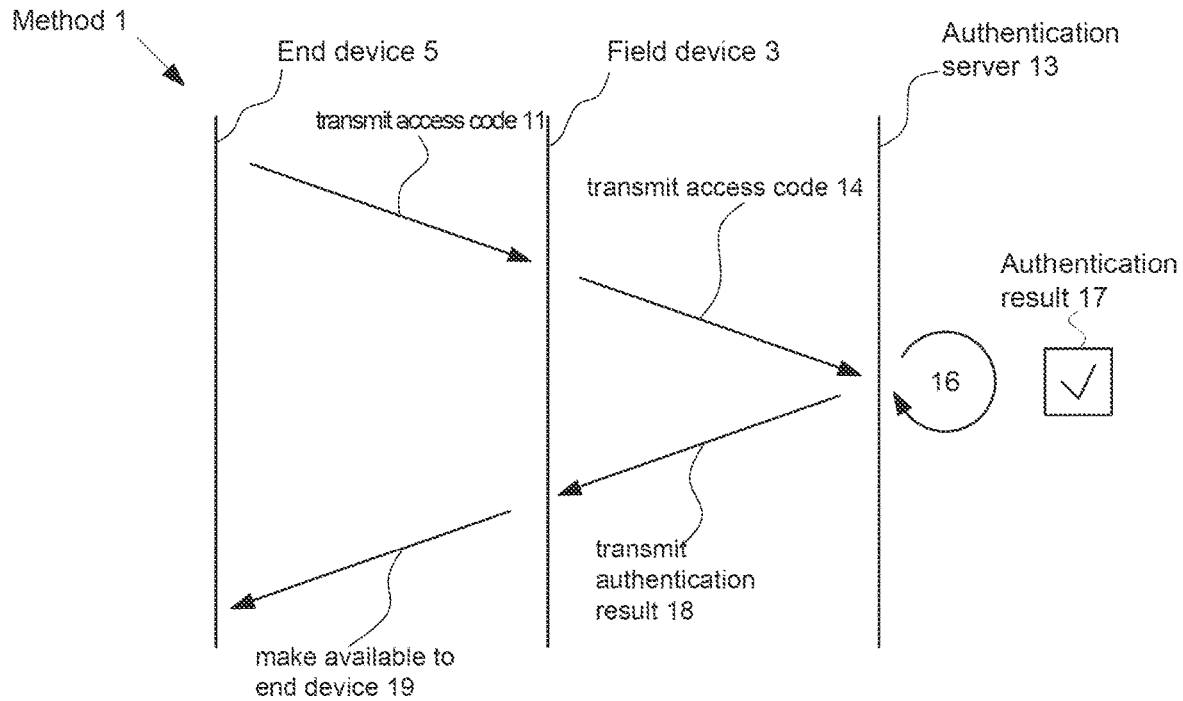
FIG. 2 illustrates an embodiment of the method according to the invention with a positive result of the authenticity check in the manner of a sequence diagram.
Figure 3:
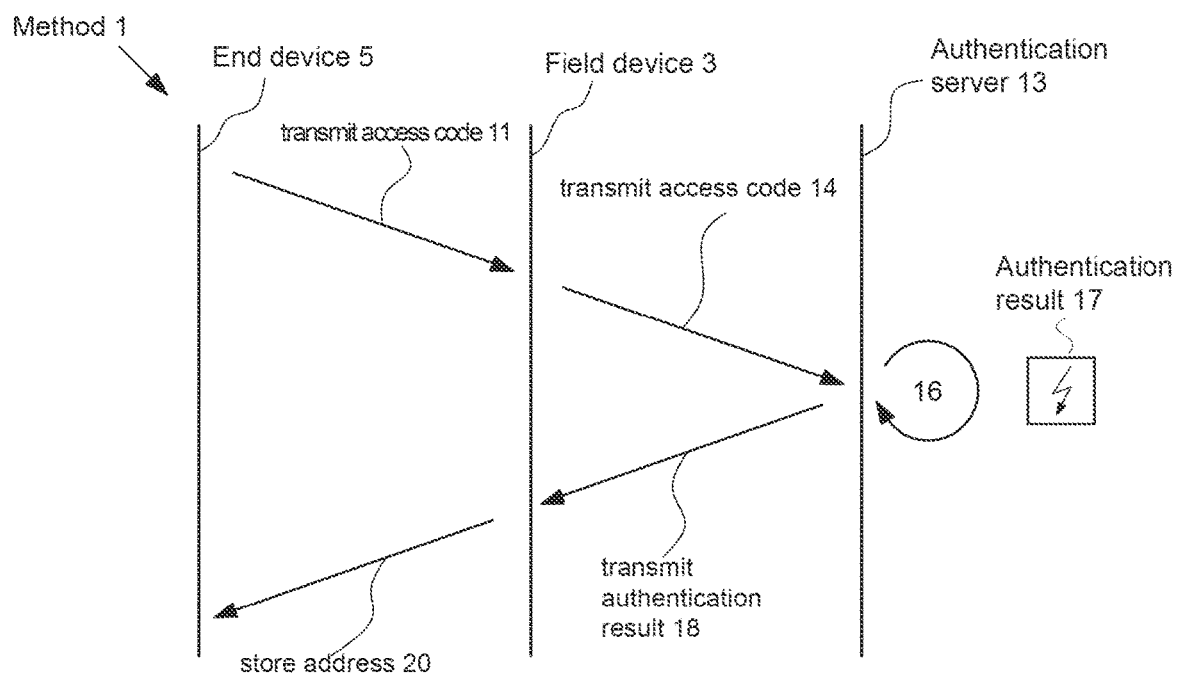
FIG. 3 illustrates a further embodiment of the method according to the invention with a negative result of the authenticity check in the manner of a sequence diagram.

Since the chronological sequence of the method 1 cannot be easily recognized within the representation of FIG. 1, the sequences are again shown in FIG. 2 and FIG. 3 in the form of sequence diagrams. The left vertical line represents the end device 5, the middle vertical line represents the field device 3 and the right vertical line represents the authentication server 13. In FIG. 2 as well as in FIG. 3, it is shown that the end device 5 requests access to the field device 3. In FIG. 2 the result 17 of the authenticity check is positive, in FIG. 3 the result is negative.

The method 1 starts with the end device 5 transmitting its access code 10 to the field device 3. The field device 3 is connected to the authentication server 13 and transmits 14 the access code 10 or a derived access code 10' to the authentication server 13. The authentication server 13 thus either receives the access code 10 directly or it infers the original access code 10 from the derived access code 10'.

Based on the authentication data 15 stored on the authentication server 13, the authentication server 13 now checks 16 whether the access code 10 is known. The authentication result 17 is positive in the case shown in FIG. 2. The authentication server 13 now transmits the authentication result 17 to the field device 3. The field device 3 then makes 19 certain resources available to the end device 5.

Deviating from this, the authentication result 17 in the execution example shown in FIG. 3 is negative. Here, too, the—negative—authentication result 17 is communicated 18 to the field device 3 by the authentication server 13, but the field device 3 does not make any resources available to the end device 5. In this case, it only signals to the end device 5 that communication cannot be established. Such a—negative—feedback from the field device 3 to the end device 5 can also simply be omitted.

FIG. 1 also shows that an individual end device name 10a and an individual end device password 10b are stored as individual access code 10 for the end device 5. Alternatively, the access code 10 can also be an individual username 10a and an individual user password 10b. This has the advantage, for example, that different users of the end device 5 can be distinguished from one another if they have different usernames 10a and different user passwords 10b.

Furthermore, FIG. 1 shows, in respect to the field device 3 and to the authentication server 13, that the address 20 of the authentication server is stored in the field device 3, whereby the server communication link 12 is established using the address 20 of the authentication server 13.

FIG. 1 also shows that cryptographic means 21 are stored in the field device 3 and in the authentication server 13, which allow the field device 3 and the authentication server 13 to exchange encrypted data with each other. The field device 3 derives an encrypted derived access code 10' from the access code 10 with its cryptographic means 21 and transmits 14 it to the authentication server 13. The authentication server 13 decrypts the encrypted derived access code 10' into the access code 10 with its cryptographic means 21.

FIG. 1 further shows, in respect to the authentication server 13, that the authentication data 15 of the authentication server 13 also comprises scopes of rights 22 associated with an access code 10 and that the authentication result 17 transmitted by the authentication server 13 to the field device 3 also comprises the scope of rights 22 associated with an access code 10. The authentication data 15 for the authentication server 13 is represented in FIG. 1 by a table. The values that are arranged in one line are linked here.

It is also evident from FIG. 1 that the authentication data 15 of the authentication server 13 also includes session attributes 23 associated with an access code 10 and that the authentication result 17 transmitted from the authentication server 13 to the field device 3 also includes the session attributes 23 associated with an access code 10. These session attributes 23 are then also transmitted 18 from the authentication server 13 back to the field device 3.

The field device 3 knows the meaning of the scopes of rights 22 or the session attributes 23 either by storing corresponding definitions directly in the field device 3 or by storing the definitions on the authentication server 13 and also transmitting them back to the field device 3.

Figure 4:
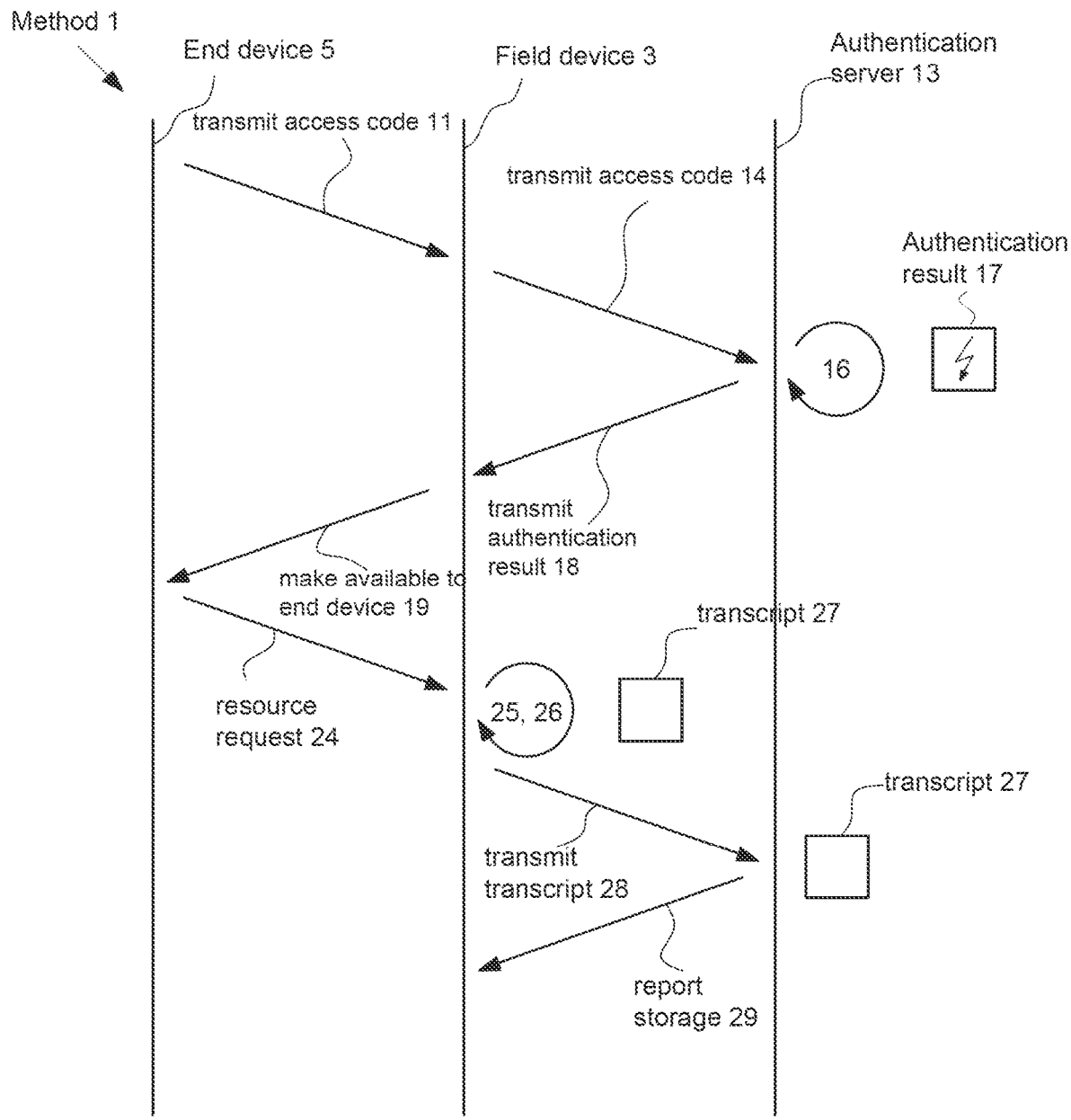
FIG. 4 illustrates an embodiment of the method according to the invention with logging of the communication between field device and end device in the manner of a sequence diagram.

FIG. 4 illustrates another special function of the method which is made possible by using the authentication server 13. The upper part of the sequence diagram corresponds to the representation according to FIG. 2. A communication request was sent to the field device 3 by the end device 5, the end device 5 was then able to be recognized by the authentication server 13 after checking 16 the authenticity, so that basic resources of the field device 3 can be made available 19 to the end device 5. In FIG. 4, the end device 5 requests a resource of the field device 3 and the resource request 24 is subsequently processed 25 on the field device 3. What is important here is that the communication between the field device 3 and the end device 5 is logged 26 in a transcript 27. After the communication between the end device 5 and the field device 3 is completed, the transcript 27 is transmitted 28 to the authentication server 13 and stored there. In the embodiment shown, the authentication server 13 still reports 29 the successful storage of the transcript 27 to the field device 3. This is not mandatory.

Thus, a system 2 comprising the field device 3 and the authentication server 13 is essential for secure communication between the field device 3 and the end device 5, whereby the field device 3 can be connected to other field devices 3a, 3b, 3c, 3d and a process control system 8 via the fieldbus interface 7. The field device 3 comprises data processing electronics 30, which comprise practically all the electronics within the field device 3. The field device 3 has an end device communication interface 31 different from the fieldbus interface 7, via which it can be connected to the end device 5. The field device 3 is connected to the authentication server 13 via a server communication interface 32. The data processing electronics 30 are designed to receive an individual access code 10 of the connected end device 5 via the end device communication interface 31. Furthermore, the data processing electronics 30 are designed such that they can and do transmit the access code 10 or an access code 10' derived from the access code 10 to the authentication server 13 via the server communication interface 32.

Authentication data 15 is stored on the authentication server 13, which is used to check 16 the authenticity of the access code 10 on the authentication server 13.

The data processing electronics 30 are also designed to receive the authentication result 17 determined by the authentication server 13 via the server communication interface 32. Finally, the data processing electronics 30 are designed such that, depending on the received authentication result 17, it makes 19 resources of field device 3 available to the end device 5.

A primary goal is to design the field device 3 in such a manner that the fieldbus interface 7 and software services related to the fieldbus interface 7 cannot be influenced by other components of the field device 3. This is the only way to ensure that system security is not endangered under any circumstances, especially not by interventions via the end device communication interface 31 or the server communication interface 32. In the illustrated implementation of the field device 3, the server communication interface 32, the end device communication interface 31 and any software services associated with these communication interfaces 31, 32 are implemented on the field device 3 in isolation, i.e. in particular, implemented in isolation from the fieldbus interface 7 and from software services associated with the fieldbus interface 7. Thus, it is not possible to influence the fieldbus interface 7 and software services related to the fieldbus interface 7 via the server communication interface 32, via the end device communication interface 31 and via any software services related to these communication interfaces 31, 32.

The invention claimed is:

1. A method for secure communication between a field device in automation technology and an end device connected to the field device via an end device communication link, wherein the field device has a cause-effect relationship with a physical process by measuring a process variable of the physical process by a sensor of the field device, and wherein the field device is connectable via a field bus interface to other field devices and/or a process control system for the exchange of process information, the method comprising:
storing an individual access code in the end device;
transmitting the access code from the end device to the field device;
connecting the field device to an authentication server via a server communication link;
using the field device to transmit the access code or an access code derived from the access code to the authentication server;
storing authentication data on the authentication server, on the basis of which the authenticity of the access code is checked on the authentication server;
transmitting the resulting authentication result from the authentication server via the server communication link to the field device; and
depending on the authentication result transmitted to the field device, making resources of the field device available to the end device;
wherein the field device at least partially logs the communication with the end device in a transcript for tracing influences on the field device; and
wherein the transcript is transmitted to the authentication server upon completion of the communication and the transcript is stored on the authentication server, or is continuously transmitted to the authentication server during communication and the transcript is stored on the authentication server.

2. The method according to claim 1, wherein an individual end device name and an individual end device password are stored as an individual access code; and/or
wherein the individual access code has an individual username and an individual user password of a user of the end device connected to the field device.

3. The method according to claim 1, wherein the address of the authentication server is stored in the field device and the server communication link is established using the address of the authentication server.

4. The method according to claim 1, wherein cryptographic means are stored in the field device and in the authentication server, which means allow the field device and the authentication server to exchange encrypted data with one another;
wherein the field device with its cryptographic means derives an encrypted derived access code from the access code and transmits it to the authentication server; and
wherein the authentication server with its cryptographic means decrypts the encrypted derived access code to the access code.

5. The method according to claim 1, wherein the authentication data of the authentication server also includes scopes of rights associated with an access code; and
wherein the authentication result transmitted by the authentication server to the field device also includes the scopes of rights associated with an access code.

6. The method according to claim 5, wherein a scope of rights is one of the following scope of rights: read access only, restricted read access, write access, restricted write access, function request; and
wherein the scope of rights is provided with a parameter list and/or function list.

7. The method according to claim 5, wherein the scopes of rights designate groups of sub-rights;
wherein the definitions of the groups of sub-rights are either stored on the field device or stored on the authentication server and are transmitted to the field device upon request; and
wherein possible groups of sub-rights are user, operator, expert, service, factory.

8. The method according to claim 1, wherein the authentication data of the authentication server also includes session attributes associated with an access code;
wherein the authentication result transmitted from the authentication server to the field device also includes the session attributes associated with an access code; and
wherein a session attribute includes at least one of: session language, session duration, absolute session time, number of session accesses, session interface.

9. The method according to claim 5, wherein the field device provides the end device with an individualized user interface and the user interface is individualized on the basis of the scopes of rights and/or the session attributes; and wherein the field device provides the end device with the individualized user interface by means of an individualized web server or the field device individualizes the user interface of a physical display of the field device itself.

10. The method according to claim 1, further comprising:
performing an evaluation of the transcript to determine a measure that has been taken via a communication between the field device and the end device over the end device communication link.

11. The method according to claim 1, wherein the end device communication link and/or the server communication link is/are designed according to one of the following technologies: Bluetooth, wireless local area network, infrared, Ethernet.

12. A system for secure communication, comprising:
a field device of automation technology; and
an authentication server;
wherein the field device has a cause-effect relationship with a physical process by measuring a process variable of the physical process by a sensor of the field device;
wherein the field device is configured to be connected to other field devices and/or a process control system;
wherein the field device includes data processing electronics, wherein the field device is configured to be connected to an end device via an end device communication interface different from the field bus interface;
wherein the field device is connected to the authentication server via a server communication interface;
wherein the data processing electronics is designed to receive an individual access code of the connected end device via the end communication interface;
wherein the data processing electronics is designed to transmit the access code or an access code derived from the access code to the authentication server via the server communication interface;
wherein authentication data is stored on the authentication server, on the basis of which the authenticity of the access code is checked on the authentication server;
wherein the data processing electronics is designed to receive an authentication result determined by the authentication server via the server communication interface;
wherein the data processing electronics makes resources of the field device available to the end device depending on the received authentication result;
wherein the field device at least partially logs the communication with the end device in a transcript for tracing influences on the field device; and
wherein the transcript is transmitted to the authentication server upon completion of the communication and the transcript is stored on the authentication server, or is continuously transmitted to the authentication server during communication and the transcript is stored on the authentication server.

13. The system according to claim 12, wherein the field device and the authentication server are designed to carry out a method including the steps of:
storing an individual access code in the end device;
transmitting the access code from the end device to the field device;
connecting the field device to an authentication server via a server communication link;
using the field device to transmit the access code or an access code derived from the access code to the authentication server;
storing authentication data on the authentication server, on the basis of which the authenticity of the access code is checked on the authentication server
transmitting the resulting authentication result from the authentication server via the server communication link to the field device; and
depending on the authentication result transmitted to the field device, making resources of the field device available to the end device.

14. The system according to claim 12, wherein the server communication interface, the end device communication interface and any software services associated with these communication interfaces are implemented on the field device isolated from the field bus interface and from software services associated with the field bus interface, so that an influencing of the field bus interface and of software services associated with the field bus interface via the server communication interface, via the end device communication interface and via any software services associated with these communication interfaces is not possible.

\* \* \* \* \*